United States Patent [19]
Lester

[11] Patent Number: 5,246,182
[45] Date of Patent: Sep. 21, 1993

[54] ELECTRICAL FENCE WIRE WINDING ATTACHMENT FOR TRACTORS

[76] Inventor: Waymon Lester, Rte. 1 Box 278, Portal, Ga. 30450

[21] Appl. No.: 933,914

[22] Filed: Aug. 27, 1992

Related U.S. Application Data

[63] Continuation of Ser. No. 712,401, Jun. 10, 1991, abandoned.

[51] Int. Cl.⁵ .......................................... B65H 16/00
[52] U.S. Cl. ................................................ 242/86.5 R
[58] Field of Search .............. 242/86.5 R, 86.2, 86.52, 242/86.8, 158 B, 157.1

[56] References Cited

U.S. PATENT DOCUMENTS

| | | | |
|---|---|---|---|
| 2,765,991 | 10/1956 | Frey et al. | 242/86.5 R |
| 2,823,873 | 2/1958 | Peterson | 242/86.5 R |
| 2,828,089 | 3/1958 | Isenberger | 242/86.5 R |
| 2,998,094 | 8/1961 | Fisher | 242/158 R |
| 3,107,877 | 10/1963 | Weakland | 242/86.5 R |
| 3,690,409 | 9/1972 | Brauss | 254/332 X |
| 4,002,321 | 1/1977 | Shaw et al. | 242/158 R |
| 4,553,590 | 11/1985 | Phillips | 242/158 R |

FOREIGN PATENT DOCUMENTS

| | | | |
|---|---|---|---|
| 1273119 | 11/1961 | France | 242/86.5 R |
| 936089 | 9/1963 | United Kingdom | 242/86.8 |

Primary Examiner—Daniel P. Stodola
Assistant Examiner—John Rollins
Attorney, Agent, or Firm—Laurence R. Brown

[57] ABSTRACT

A wire winding reel attachment for use on a tractor for winding electrical fence wire is journalled at a rear rotating shaft bearing at a vertical height established by a stanchion attachable to a vertically movable tractor draw bar. This draw bar may be raised to align the rotating shaft with the tractor power takeoff shaft for powered rotation. Vertical movement of the drawbar effects a tilting of the rotating shaft with respect to the oncoming wire so that the wire is caused to traverse the rotating shaft as it is wound thereon. A rotary slip clutch prevents overload of the reel either during winding or as a safety feature in the event that the reel or the wire is contacted by persons or livestock. A subassembly of the winding reel attachment tractor mount assembly permits removal of the winding reel and a shaft for rotatably mounting external to the tractor mount such as for unwinding wire wound on the reel.

1 Claim, 1 Drawing Sheet

ELECTRICAL FENCE WIRE WINDING ATTACHMENT FOR TRACTORS

This application is a continuation of application Ser. No. 07/712,401, filed Jun. 10 1991, now abondoned.

TECHNICAL FIELD

This invention relates to farming machinery and more particularly it relates to tractor mounted attachments for winding electrical fence wire.

BACKGROUND ART

A farming chore to which this invention is directed is the winding up of electrical fence wire used to contain domestic animals. With tractor powered attachments the wire may be pulled in and wound effectively and efficiently. However such attachments of the prior art impose problems in mounting, safety of use about people and livestock, safety in control of the tractor during winding and the ability to wind at high speeds and uniformly distribute the wire about a windup reel.

The U.S. Pat. No. 2,823,873 to E. E. Peterson, Feb. 18, 1958 has a wire winding spool drive axle directly connected to a tractor drive shaft for rotation. The weight of the axle and reel extending rearwardly from the tractor are supported by braces fixed to the tractor frame. The spool is loosely fitted to the rotating drive axle without retention means, and is friction driven by a radial wire contacting the axle to impart a drive torque. The spool thus slips on the shaft under significant load. There are problems operating such an array because the very small drive torque for the spool limits the load and does not react well under full spool capacity because of the greater torque necessary for winding. Also since the spool is not secured on the shaft it can come off the back end, and tends to do so if the tractor is not parked on a level spot so that the drive axle is slanted downwardly. Furthermore the wire cannot easily be layer wound without dangerous manual intervention. Additionally, the spool weight is supported at its rear end only by the laterally extending axle-brace assembly so that there is a tendency to bend the axle and to whip the spool around during winding.

As will be set forth in more detail hereinafter, it is an object of this invention to overcome these problems of the prior art by improved wire winding attachments for tractors provided by this invention.

DISCLOSURE OF THE INVENTION

In accordance with this invention therefore a winding reel attachment is provided for drive from the take off drive shaft of the tractor. A rotary drive shaft, carrying the reel, is extended laterally behind the tractor substantially horizontally to the ground, and is journalled at its rear end in a vertically disposed stanchion so that the drive shaft does not tend to bend and the reel is maintained on the shaft. The shaft is coupled to the tractor power take-off drive by means of a universal joint and a slip clutch. Thus, exact shaft alignment need not be maintained as when the shaft is rigidly braced in place. Also the slip clutch provides a safety factor for overloading, which is desirable in view of the considerable power available from a tractor take off drive shaft, if the wire becomes snagged or is contacted by humans or animals.

With this configuration, the rear journal stanchion is positionable on a powered tractor draw bar for alignment of the tractor drive shaft with a reel driving shaft. A significant advantage in positioning the wire winding mount on a vertically movable tractor draw bar is that the draw bar may be moved up and down for the purpose of level winding the wire on the reel in even layers. Thus, when the reel shaft is inclined downwardly the wire tends to wind on the rear end of the spool, and if inclined upwardly it tends to wind on the front end of the spool. In this manner the drawbar may be manipulated to control winding in level wound layers.

It has been found in tests conducted under actual conditions found on farms that the assembly afforded by this invention does in fact operate satisfactorily and safely over a wide range of conditions encountered in the winding up of wire used in electrical fencing.

Other objects, features and advantages of the invention will be found throughout the following more detailed description and the accompanying drawings.

BRIEF DESCRIPTION OF THE DRAWINGS

In the drawings, wherein like reference characters used in the various views indicate similar features to facilitate comparison.

THE PREFERRED EMBODIMENT

Figure 1:
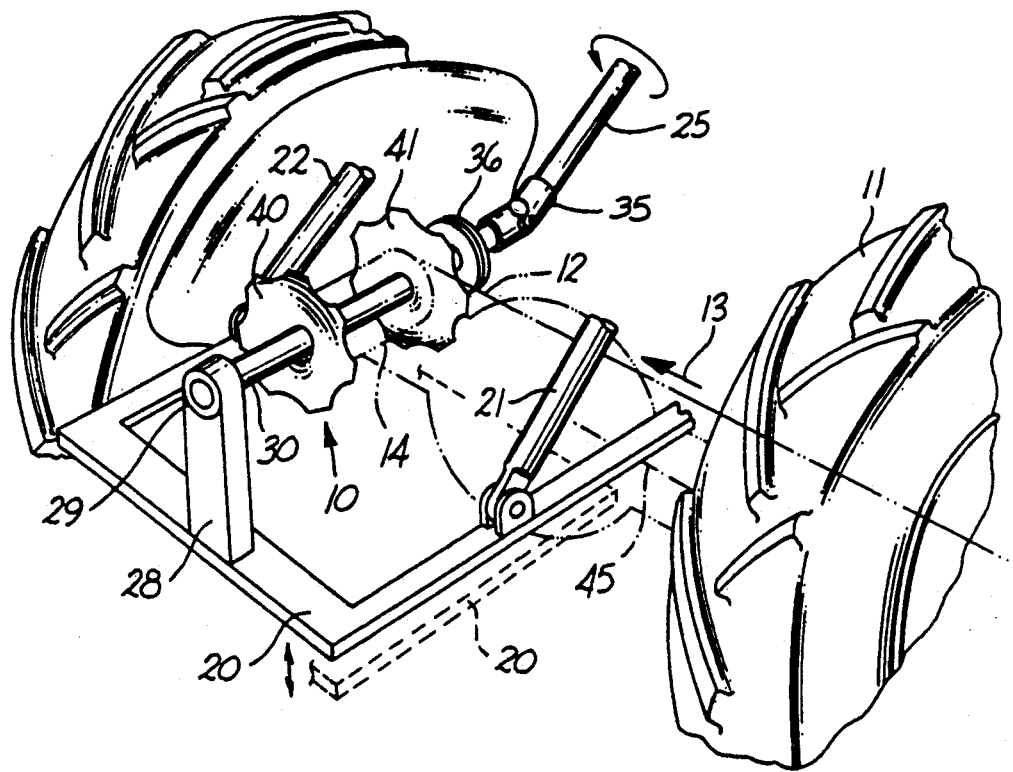
FIG. 1 is a partial rear end perspective view of a tractor with draw bar positioned to align the winding reel shaft with the tractor power take off coupling.

Now with reference to the accompanying drawing, it is seen that a wire mounting reel attachment is particularly adapted to be tractor mounted on the tractor 11, partly shown, for winding up electrical fence wire 12 in the direction of arrow 13 onto the reel 14. The tractor has a vertically positionable draw bar attachment 20, which is lowered and raised by means of a hydraulic mechanism on the tractor (not shown) attached to bracing arms 21, 22. Power is taken off the tractor by means of a power takeoff rotary shaft 25.

A stanchion 28 is mounted onto drawbar 20 by suitable bracing and bolts (not shown) and supports a bearing 29 into which the shaft of the shaft 30 is journalled. Thus at an appropriate vertical position of the drawbar 20, the shaft 30 is horizontally disposed, as cantilevered in bearing 29, and aligned for powered rotation from power takeoff shaft 25, by rotary hitching means, preferably the universal joint 35, which permits some misalignment and functionally is important for reasons hereinafter discussed. Slip clutch, 36, preferably adjustable, is coupled in line with the reel shaft 30, preferably at the powered end, to slip in response to overloading, which may be caused by contact of persons or animals with the wire 13 or when the loading on reel 14 indicates it is fully wound.

The wire reeling structure is defined by a pair of spaced apart limiting flanges 40, 41, extending substantially normally to the shaft and typically mounted on shaft 30 to rotate therewith. Thus the attachment 10 has its rotary shaft 30 extending normally rearward from the wheel drive axis 45.

Figure 2:
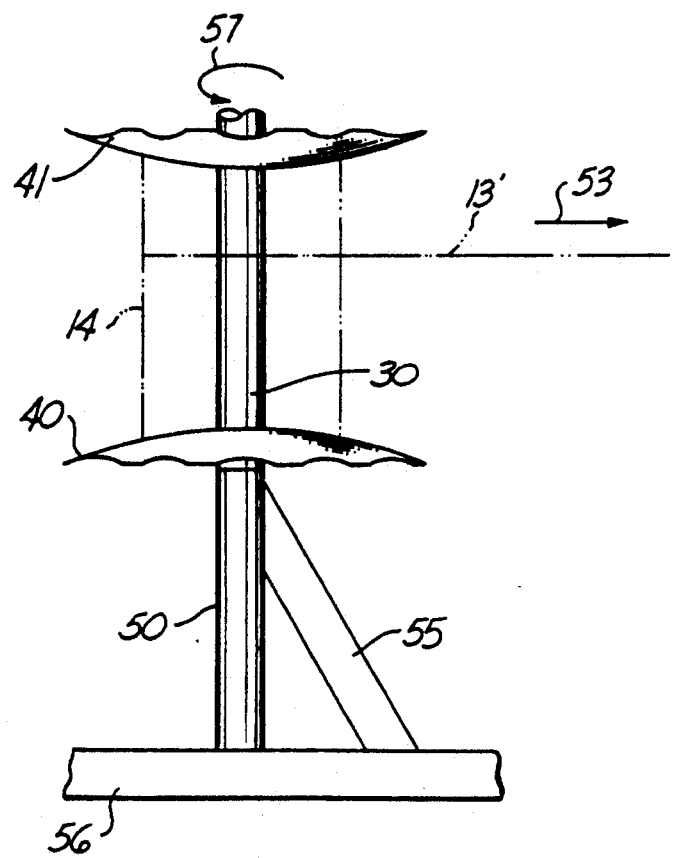
FIG. 2 is an elevation view of a vertical mount for the spool axle, useful in unwinding wire from the spools.

The reel attachment 10 comprises a unit removable from the stanchion 28 to rotate in alternative journalling means, such as the upstanding pipe 50 shown in FIG. 2. Thus, the reel can be removed from the tractor for unwinding the wire 13' in the direction of arrow 53 as the reel rotates 57 about a vertical axis. The brackets 55, 56 typically permit mounting on a pickup truck or the drawbar 20 of the tractor, etc.

This tractor drawbar mount afforded by this invention serves the additional function or purpose of permitting the wire to be level wound on the reel 14. Particularly by means of the universal joint 35, the reel shaft 30 does not have to be exactly aligned with the power takeoff shaft 25 of tractor 11. When that is necessary, then the wire 13 must be manipulated with a tool, etc., for level winding upon the reel 14, which is very dangerous if done by hand, and difficult if automatic level winding means is provided. The tractor drawbar 20 however can be raised and lowered just enough during the winding process to distribute the wire evenly on the reel 14. Thus, if the rear end of the reel is lowered by means of drawbar 20, the wire will tend to wind toward the rear end of the reel and visa versa. Thus, the movement of the drawbar will result in evenly distributing the wire on reel during winding without any need to use extra tools or to interfere with the path of the wire during the winding process.

Having therefore improved the state of the art, those features of novelty are defined with particularity to identify the spirit and nature of this invention in the following claims:

I claim:

1. An apparatus for winding barb wire on a reel comprising in combination:

a tractor having a rear axle, a power take-off shaft extending normal to the rear axle, and a drawbar mounted for vertical movement relative to said tractor;

a stanchion mount extending from said drawbar and having a bearing journalled in an end opposite said drawbar;

a driven shaft having a first end rotably mounted in said bearing, extending towards said power take-off shaft, and supporting thereon a pair of spaced apart flanges extending normal to said driven shaft and defining a reeling portion of said driven shaft between said flanges;

said driven shaft being coupled at a second end to said power take-off shaft through a slip clutch providing a constant torque to said driven shaft and a universal joint for transmitting torque to said driven shaft as said driven shaft pivots with respect to said power take-off shaft;

whereby a portion of said wire is wound about said reeling portion of said driven shaft and a portion of said wire approaches said driven shaft at an angle to the axis of said driven shaft;

whereby vertical movement of said draw bar moves said first end of said driven shaft with respect to said second end of said driven shaft so that said axis assumes an oblique angle to the direction of tension in said wire and causes said tension to act in a direction parallel to said axis and said wire to transverse along said driven shaft as the wire is level wound thereon.

* * * * *